June 9, 1925.  1,541,139
J. B. HAYDEN ET AL
COUPLING
Original Filed Sept. 14, 1923
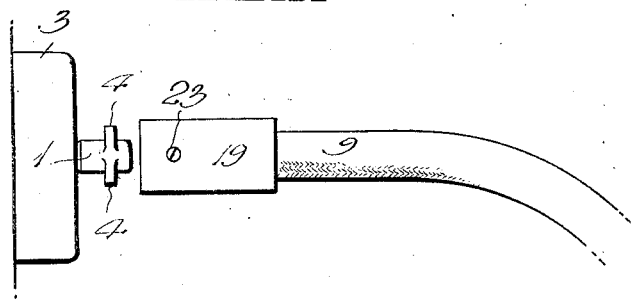
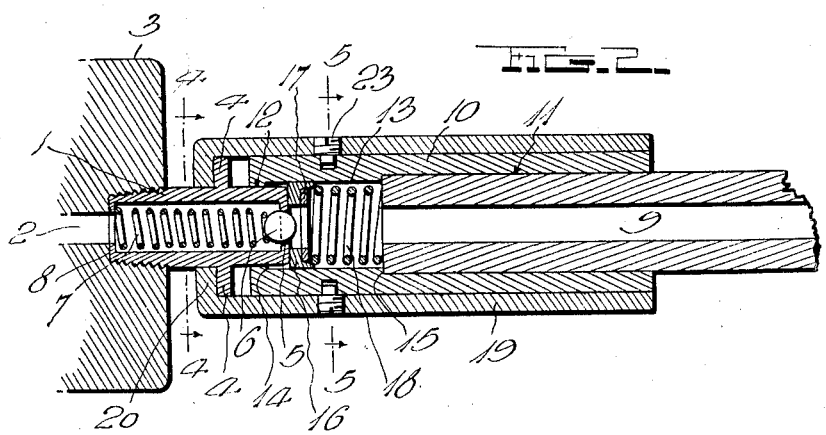
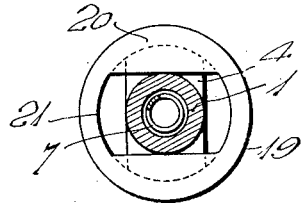
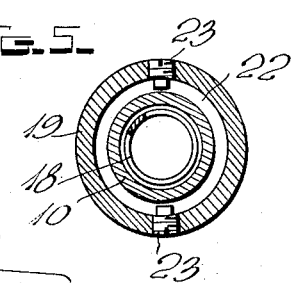
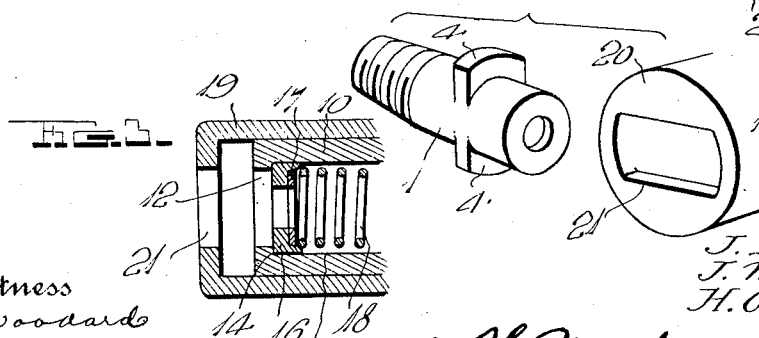
Witness
H. Woodard
Inventors
J. B. Hayden
J. Morris
H. C. George
By H. D. Wilson & Co.
Attorneys Patented June 9, 1925.

1,541,139

UNITED STATES PATENT OFFICE.

JOSEPH BENNETT HAYDEN, JOHN MORRIS, AND HARRY C. GEORGE, OF GREENSBURG, PENNSYLVANIA.

COUPLING.

Original application filed September 14, 1923, Serial No. 662,674. Divided and this application filed March 27, 1924. Serial No. 702,372.

*To all whom it may concern:*

Be it known that we, JOSEPH BENNETT HAYDEN, JOHN MORRIS, and HARRY C. GEORGE, citizens of the United States, residing at Greensburg, in the county of Westmoreland and State of Pennsylvania, respectively, have invented certain new and useful Improvements in Couplings; and we do declare the following to be a full, clear, and exact description of the invention, such as will enable others skilled in the art to which it appertains to make and use the same.

This invention relates to improvements in couplings, designed primarily for connecting high pressure grease hoses to projecting nipples on machine parts, so that heavy grease may be forced through these nipples to lubricate the machine.

It is the object of the invention to provide a simple and inexpensive coupling which may be quickly and easily applied or detached, and will establish an effective grease-tight connection.

The present application forms a division of our pending U. S. application, Serial No. 662,674, filed September 14, 1923.

With the object above set forth in view, the invention resides in the novel subject matter hereinafter described and claimed, the description being supplemented by the accompanying drawing.

Figure 1 is a side elevation showing a coupling constructed in accordance with our invention.

Figure 2 is an enlarged longitudinal sectional view, showing the coupling engaged with a nipple.

Figure 3 is a detail sectional view of the coupling removed from the nipple.

Figures 4 and 5 are transverse sections on lines 4—4 and 5—5 of Fig. 2.

Figure 6 is a perspective view showing a portion of the coupling and a nipple in juxtaposition.

In the drawing above briefly described, the numeral 1 designates a nipple, communicating with a grease port 2 of a machine part 3, said nipple being provided with a pair of opposed, flat lugs 4 at a point spaced inwardly from its outer end, for engagement with the coupling described below. The outer end of the nipple 1 is formed with an inwardly extending valve seat 5 co-acting with a ball valve 6 which is normally seated by a coiled spring 7 and the inner end of said nipple is formed with an inwardly extending flange 8 against which the spring thrusts.

The numeral 9 designates a high pressure grease supply hose which is usually formed of metal or at least metal covered. At the outlet end of this hose, an elongated tubular inner sleeve or casing 10 is provided, said casing having a relatively long and large internal diameter 11 at its rear end, a much smaller and short internal diameter 12 at its front end, and an intermediate internal diameter 13 between the diameters 11 and 12, this formation serving to provide a shoulder 14 at the inner end of the diameter 12, and a similar shoulder 15 at the inner end of the intermediate diameter 13. The hose 9 is preferably soldered in the larger diameter 11 and the shoulder 15 limits the insertion of this hose. The diameter 12 is intended to receive the outer end of the nipple 1 as shown in Fig. 2, and a spring-pressed packing is provided in the diameter 13 to abut the end of the nipple. This packing preferably includes a flexible gasket 16 which, when the coupling is removed from the nipple, abuts the shoulder 14 as shown in Fig. 3. Contacting with the inner side of the gasket 16, a cup washer 17 has been shown, and a coiled compression spring 18 has its ends disposed in contact with the washer 17 and the end of the hose 9.

Rotatably surrounding the tubular casing 10, is a sleeve 19, said sleeve projecting forwardly from the front end of said casing 10 and being of an internal diameter to receive, within its interior, the lugs 4. The sleeve 19 is provided with a closed front end 20 having a transverse slot 21 through which the nipple 1 and the lugs 4 are insertible, when said sleeve is turned to aline the slot 21 with said lugs. The space between the inner side of the wall 20 and the casing 1 is greater than the thickness of the lugs 4, so that when applying or releasing the coupling, it may be forced inwardly until said lugs strike the end of the casing, thus freeing the wall 20 of all contact with said lugs and permitting said casing to be turned with ease to an operative or inoperative position.

To mount the sleeve 19 rotatably upon the tubular casing 10, we prefer to provide the latter with a peripheral groove 22, and to pass studs 23 inwardly through the sleeve for reception in said groove.

By providing the construction shown and described, or a substantial equivalent thereof, a coupling is provided which may be quickly and easily applied or released, and will establish a tight connection with the nipple when in use, to prevent any leakage of grease. Attention may be directed to the fact that normally, the spring 18 seats the gasket or packing washer 16 against the seat or shoulder 14 which is entirely independent of the sleeve 19. Thus, the latter is freely and easily rotatable upon the inner sleeve or casing 10 so that it may readily be turned to aline the slot 21 with the lugs 4, when applying the device to the nipple 1.

Excellent results may be obtained from the details disclosed, and they may therefore be followed if desired, but within the scope of the invention as claimed numerous minor changes may be made.

We claim:—

1. A coupling for connection with a nipple having lateral lugs spaced inwardly from its end; said coupling comprising a tubular casing adapted at its rear end to be secured to a hose and open at its front or outer end for reception of the above-named nipple, said outer end of the casing being adapted to abut the lugs of the nipple to limit its insertion into the casing, a spring-pressed packing within said tubular casing to yieldably press against the nipple and establish a tight connection therewith, a tubular sleeve rotatable and non-slidable on said tubular casing, said sleeve having a front end extended beyond said open end of said tubular casing and of an internal diameter to receive within its interior the lateral lugs on the above-named nipple, said front end of said sleeve having an end wall formed with a transverse slot through which the aforementioned nipple and lugs are insertible, the inner side of said end wall being adapted to engage the lugs when the sleeve is turned on the casing and being spaced outwardly from the outer end of said casing a distance slightly greater than the thickness of the lugs, permitting said end wall of the sleeve to be entirely freed of contact with the lugs when turning said sleeve.

2. A coupling for connection with a nipple having lateral lugs spaced inwardly from its outer end; said coupling comprising an elongated tubular casing of uniform external diameter throughout its length, said casing having a small short internal bore at its front end, a large elongated internal bore at its rear end, and an intermediate bore between said small and large bores, shoulders being formed at the juncture of the three bores, the larger bore of said casing being adapted to receive a conduit intended to abut one of said shoulders, a gasket within the intermediate bore of the casing normally abutting the other shoulder, a coiled spring in the casing to normally force said washer forwardly against the foremost shoulder, and an elongated tubular sleeve rotatably and non-slidably surrounding said casing, the front end of said sleeve projecting forwardly from said casing and being of an internal diameter to receive the lugs of the above-named nipple when the end of such nipple is forced into the small bore at the front end of the casing, said sleeve having a front end wall formed with a transverse slot through which the nipple and its lugs are insertible, the inner side of said wall being spaced from the front extremity of the aforesaid casing a distance slightly greater than the thickness of the lugs and being adapted to engage said lugs when the sleeve is turned on the casing.

In testimony whereof we have hereunto affixed our signatures.

JOSEPH BENNETT HAYDEN.
JOHN MORRIS.
HARRY C. GEORGE.